United States Patent [19]

Passerell et al.

[11] Patent Number: 4,487,432
[45] Date of Patent: Dec. 11, 1984

[54] NO-HOLE INSERTION JOINT

[75] Inventors: David P. Passerell, Geneva; Frank R. Volgstadt, Madison, both of Ohio

[73] Assignee: Perfection Corporation, Madison, Ohio

[21] Appl. No.: 312,703

[22] Filed: Oct. 19, 1981

[51] Int. Cl.³ ............................... F16L 9/14
[52] U.S. Cl. ...................... 285/15; 285/21; 285/55; 285/338; 285/DIG. 16
[58] Field of Search .......... 285/55, 338, 15, DIG. 26, 285/346, 196, 187, 21, DIG. 16; 277/26; 138/97, 89

[56] References Cited

U.S. PATENT DOCUMENTS

| | | | |
|---|---|---|---|
| 1,914,741 | 6/1933 | Gysling | 277/26 |
| 2,083,842 | 6/1937 | Henning | 285/338 X |
| 3,088,555 | 5/1963 | Karlgaard | 285/DIG. 26 X |
| 3,294,121 | 12/1966 | Powell et al. | 138/97 |
| 3,433,506 | 3/1969 | Crowe | |
| 3,578,360 | 5/1971 | Eliot | |
| 3,861,690 | 1/1975 | Englesson et al. | 277/26 |
| 3,897,619 | 8/1975 | Thivans | |
| 4,077,435 | 3/1978 | Van Scoy | 138/97 |
| 4,092,193 | 5/1978 | Brooks | |
| 4,099,323 | 7/1978 | Bouvier | |
| 4,166,479 | 9/1979 | Cleavenger | 285/55 X |
| 4,295,494 | 10/1981 | McGowan et al. | 174/DIG. 8 X |
| 4,349,047 | 9/1982 | Ditto | 138/89 X |
| 4,350,183 | 9/1982 | Holmes | 138/89 |

FOREIGN PATENT DOCUMENTS 2726091 8/1978 Fed. Rep. of Germany .

Primary Examiner—Thomas F. Callaghan
Attorney, Agent, or Firm—Fay & Sharpe

[57] ABSTRACT

A no-hole insertion joint and method for the repair or relining of fluid conduits such as gas service lines and the like. The joint structure and method are particularly adapted for use in the repair or relining of gas service lines from a building in order to eliminate the requirement of exterior digging or excavation. A tubular conduit is provided which includes, at the free and thereof, a joint and sealing structure. The tubular conduit and the attached joint and sealing structure are inserted into the existing service line a distance so as to be in proximity with the tee at the main. Once in place, the joint and sealing structure is activated by means of heat producing a melting of a low melting point alloy which, in turn, causes a gasket to be brought into sealing contact with the internal wall of the service line. The joint and sealing structure includes a sleeve of low melting point alloy, an elastomeric seal and a compression spring which is positioned so as to exert a longitudinal force on the sleeve. Upon the application of heat to the sleeve, the spring causes the melt to expand radially outwardly carrying the elastomeric gasket into sealing contact with the internal wall of the fluid conduit.

22 Claims, 6 Drawing Figures

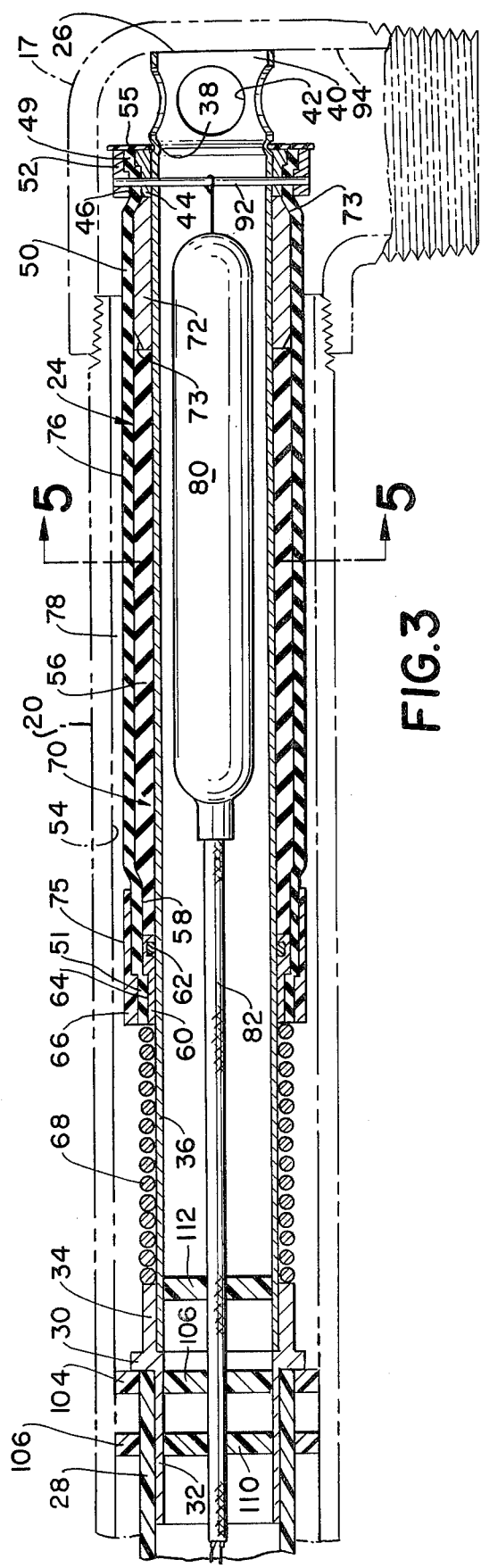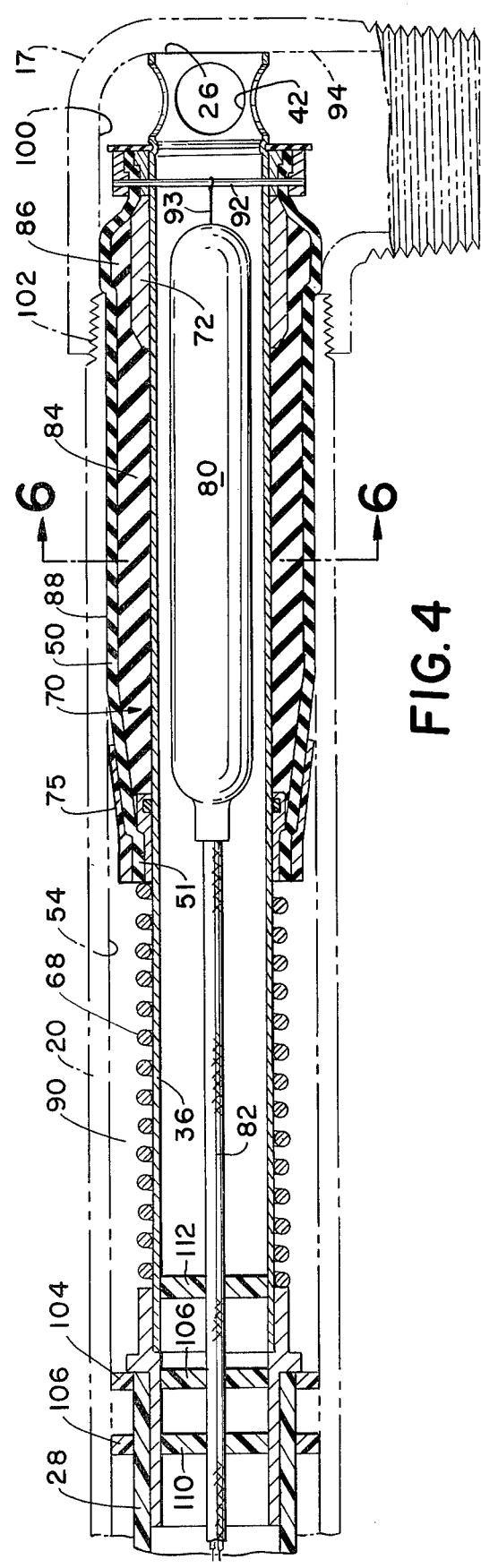

NO-HOLE INSERTION JOINT

BACKGROUND OF THE INVENTION

Plastic pipe insertions in steel gas service lines have, for the last number of years, come into widespread use. When a steel gas service line corrodes, the replacement thereof involves the complete excavation of all earth over the steel service line with the subsequent replacement of the line with a new line. This procedure has obvious drawbacks. A common expedient for repairing steel service lines without extensive excavation is to insert a plastic tube or plastic conduit into the existing line. In utilizing insertion, it is necessary to dig a hole at the gas main in order to attach the plastic tube or pipe to the main in a gastight connection. For this purpose the existing metallic pipe is cut at the main and the plastic pipe (which is inserted through the existing metallic pipe) is attached to the tee in a gastight manner. This operation requires digging a hole at the main in order to be able to expose the tee.

Where the main is located under a street or under a sidewalk (as in city areas), the hole digging process is quite costly and results in a considerable amount of excavation.

In view of the objectionable nature of the excavation at the main, it has been found to be desirable to effect a plastic insertion that does not require digging at the tee. More particularly, it has been found that the vast majority of leaks in existing service lines occur not at the tee but rather at a point somewhere along the existing metallic service line. This being the case, it is possible to be able to insert a plastic tube into an existing metallic service line from the building (where the pipe enters the building) and, thereafter, effect a seal at the remote end of the service line using remote sealing techniques.

Insertion devices adapted to be placed into existing service lines from the building are termed "no-hole" devices for the reason that there is no necessity for excavating or digging at the tee. One example of a prior art no-hole insertion device is shown in the U.S. Pat. No. 4,166,479 to Cleavenger.

The principal problem encountered in no-hole insertion devices is the establishment of a fluid tight joint and seal inside the existing service line near the tee. Since the tee is located, in many instances, 50–100 feet from the building foundation, remote sealing techniques are necessary in order to provide for establishment of a fluid tight joint and seal after insertion. Prior art remote sealing structures and methods have been known to produce, in many instances, unsatisfactory results. Corrosion problems, seal deterioration and pull-out, are all problems that are characteristic of one or more prior art devices and which have limited the acceptability of no-hole insertion devices in the gas industry.

The apparatus and structure of this invention overcome many of the problems associated with prior art devices and methods in providing for the placement and establishment of a fluid tight joint and seal in a no-hole insertion structure.

BRIEF DESCRIPTION OF THE INVENTION

Briefly described, the invention consists of joint apparatus and method for a no-hole insertion device suitable for use in the repair or lining of fluid lines such as gas service lines and the like.

Applicant provides a plastic insertion tube or conduit which has a joint and sealing structure at the free end thereof. Applicant's device is used by inserting the joint and sealing structure along with the plastic tube into an existing service line from a building. The joint and sealing structure at the end of the plastic line is pushed out into the service line as close to the tee as possible. A heating device is carried by the apparatus so as to be in proximity with the joint and sealing structure. When the insertion device is in the desired location, the heating device is activated causing a low melting point alloy sleeve material in the joint and sealing structure to melt. After melting, a compressed coil spring causes the melt to expand radially outwardly causing an elastomeric gasket to expand into sealing engagement with the internal wall of the service line. A hot melt adhesive is advantageously applied to the external surface of the gasket prior to insertion. After the gasket has been caused to be set by the expanded melt, the heating device is deactivated and the system is permitted to cool. There is, thus, established a fluid tight joint and seal between the inserted plastic conduit and the internal wall of the existing metallic service line near the tee. As a consequence, the existing metallic service line is caused to be lined from a location approximately adjacent the tee to the building thus isolating leaks in the service line.

Applicant's invention is directed to a joint for interconnecting tubular conduits, a method for the repair of a fluid conduit and a method for the lining of a fluid conduit.

DESCRIPTION OF THE PREFERRED INVENTION

The preferred embodiment of applicant's invention will now be described with reference to the accompanying drawings in which:

FIG. 3 is a longitudinal cross-sectional view of applicant's insertion apparatus in place in an existing service line prior to the application of heat to the apparatus;

FIG. 4 is a longitudinal cross-sectional view similar to FIG. 3 and showing applicant's insertion apparatus after the application of heat;

ENVIRONMENT OF THE INVENTION

Figure 1:
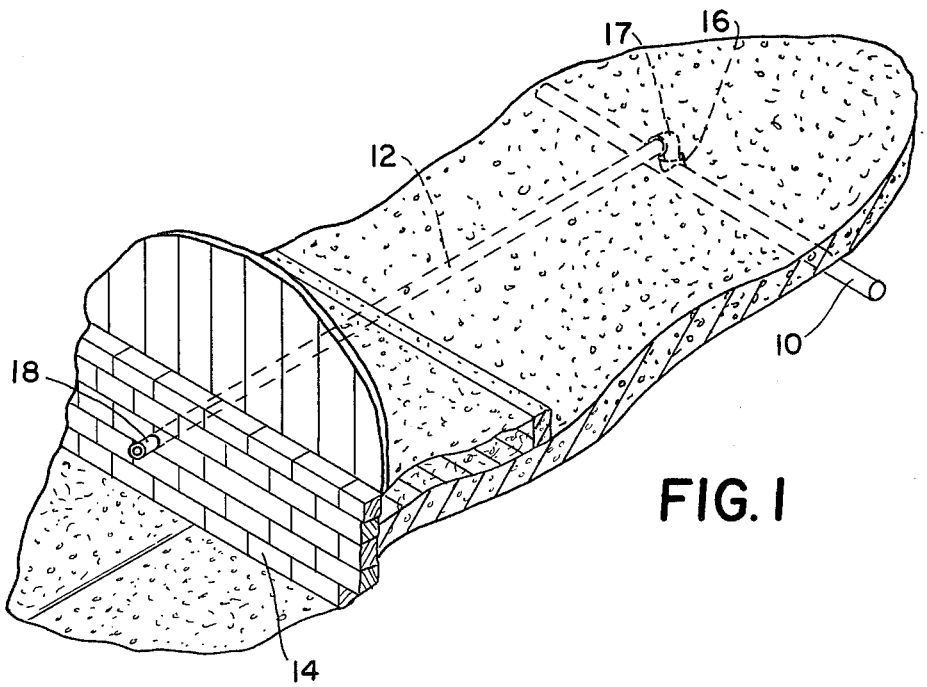
FIG. 1 is an elevational view, partly in phantom, showing a gas main and a gas service line providing an interconnection at the main for a building.

Turning briefly to FIG. 1, a brief description of the environment in which the apparatus and method of this invention are directed will be made.

There is shown in FIG. 1 a gas main 10 which is, in typical usage, buried below the surface of the ground. In urban areas, the main can be expected to be located below a street or a sidewalk. A gas service line 12 interconnects the main with a building which is designated generally 14 in FIG. 1. The gas service line typically enters the building through the foundation thereof where connections are made to a gas meter and gas appliances. A tapping tee 16 and a street ell 17 are provided at the main to provide for an interconnection of the service line 12 with the main.

The main 10 of FIG. 1 may be located several feet from the building 14 or, in other instances, it may be located as many as 50–100 feet from the building.

For decades, gas service lines have been fabricated from steel pipe which, when buried in the ground, undergoes a corrosion reaction if not protected by anode devices and/or protective coverings. When the corrosion reaction in a service line reaches the point that a leak develops, it becomes necessary to either replace the line or provide for a plastic insertion or lining therein.

The use of a plastic insertion tube or conduit for the repair or renewal of a service line has come into widespread use for the reason that it eliminates the necessity of excavating the length of the service line. In a plastic renewal, a hole or excavation is made in the vicinity of the tee at the main in order to expose the tee and permit the service line to be severed or disconnected from the tee. Thereafter, a plastic line is inserted into the service line for the full length of the service line. A fluid tight connection of the plastic conduit with the main is then made.

The method just described requires the excavation or digging of a hole at the tee in order to expose the tee for the purpose of making a gastight connection between the plastic conduit and the main. In instances where the main is located below a street or a sidewalk, renewal of the service line through plastic insertion requires air hammers and other apparatus to remove paving materials, the digging of a hole and subsequent filling and replacement of a paved surface.

The method just described is a renewal method by which the existing service line is completely removed from the fluid stream. In its place a plastic conduit is provided which has direct fluid tight interconnection with the main. The process is quite effective. Its principal drawback is the cost involved in the excavation and the disruption of traffic in urban areas where the mains are located below the street.

From a study of FIG. 1 it will be seen that where the leak is in the service line itself it is possible to effect a repair of the service line from the location 18 which is the point of entry of the service line into the building. Such a repair may be made using the "no-hole" insertion method known to the prior art. In the no-hole insertion method, a plastic tube or conduit is inserted into the service line from the building. The insertion is made as far into the service line as possible preferably such that the plastic tube or conduit extends all the way to the tee. Thereafter, prior art no-hole insertion devices have attempted to set up a seal and joint between the plastic tube and the internal surface of the service line so as to isolate the leak or leaks in the service line. Since the seal is made remotely and in a blind condition it has been difficult, using prior art apparatus, to establish consistent fluid tight joints and seals that are serviceable for a relatively long period of time.

No-hole insertion devices are directed to the repair of service lines as opposed to the renewal thereof. As used in the art, the term "repair" means a lining of a large portion of the service line with plastic tubing or conduit. Renewal, on the other hand, means the complete isolation of the entire service line and the tee and the direct interconnection of the plastic tubing or conduit with the main.

Since it is difficult if not impossible to make a direct interconnection of plastic pipe or tubing with the main using insertion methods, no-hole techniques can be used only to produce a repair of a service line. This is effective if the leaks are confined to the service line.

PREFERRED EMBODIMENT DESCRIBED

Turning initially to FIG. 3, the preferred embodiment of applicant's no-hole insertion apparatus is shown in place in a service line. The service line or first tubular conduit is designated 20 in FIG. 3 and is shown connected to an ell 17. It should be appreciated that the service line 20 of FIG. 3 corresponds to the service line 12 of FIG. 1. Similarly, the ell 17 of FIG. 3 corresponds to ell 17 of FIG. 1.

Since it is desired to insert applicant's apparatus into the service line as far as possible, the sealing and joining means of the invention which is broadly designated 24 in FIG. 3 is shown in a position such that the end 26 thereof is adjacent to or completely extended into the ell 17.

Applicant's sealing and joining means 24 is interconnected to plastic tubing or plastic pipe 28 by means of a transition body 30. In applicant's preferred embodiment, transition body 30 is manufactured from brass and includes an elongated cylindrical portion 32 which is received within plastic tubing 28. Any suitable means known to the art may be employed to join plastic tubing 28 to cylindrical portion 32 including mechanical joints, clamps and the like. One or more rows of teeth may be provided on the external surface of cylindrical portion 32 in order to enhance the interconnection of the transition body 30 with plastic tubing 28 and prevent pull-out.

Transition body 30 is also provided with a cylindrical portion 34 which is adapted to receive tube 36. In the preferred embodiment, tube 36 is fabricated from copper and is soldered to the transition body 30. Tube 36 and plastic tubing 28 together define a second tubular conduit which is disposed within the first tubular conduit 20.

Tube 36 is generally cylindrical in shape as shown in FIG. 3. A groove 38 is defined near the end 26 of the tube. An end portion 40 is defined at the extremity of tube 36. Four holes 42 are defined in end portion 40 for the purpose of admitting fluid into the interior of tube 36 from ell 17 should the fitting abut the inside wall 94 of the street ell 17.

Continuing with a description of applicant's sealing and joining means 24, a front ring 44 is soldered to the external surface of tube 36. Front ring 44 is defined by a reduced portion 46 the purpose and function of which is to enhance the clamping of the forward end 49 of gasket 50 to front ring 44 by means of the front gasket retainer ring 52.

In the preferred embodiment of applicant's invention gasket 50 is a molded Buna N rubber.

Once clamped into the position shown in FIG. 3 it should be appreciated that the forward end 49 of gasket 50 is fixed and sealed relative to tube 36 by being clamped to front ring 44 by means of retainer ring 52. A stop pin 92 is then fitted through the retainer ring 52, gasket 50 and front ring 44. Pin 92 functions to secure the gasket joint while providing for a means to position the heating element 80.

A centering washer 55 is received in groove 38 of FIG. 3. In the preferred embodiment of applicant's invention washer 55 is fabricated from Teflon and is dimensioned so that when in the position of FIG. 3 the washer provides annular centering of the device within the service line 20 thus preventing abrasion of the adhesive on the exterior surface of gasket 50 during insertion.

Disposed within gasket 50 is a low melting point alloy sleeve 56. Sleeve 56 is generally annular in shape as shown in FIG. 3 but includes a reduced end portion 58 for the purpose of accommodating gasket 50 as will be described further below.

In the preferred embodiment of applicant's invention sleeve 56 is fabricated from a low melting point or fusable alloy which melts in the range of approximately 150°–175° F. Many different alloys may be used within the spirit of the invention. Applicant has used an alloy sold under the trademark CERROBEND which has a melting point of 158° F. The composition of CERROBEND is 50% bismuth, 26.7% lead, 13.3% tin and 10% cadmium. CERROBEND has a property of expanding upon cooling as opposed to most materials. This property is significant to this invention in that as CERROBEND solidifies it expands, thus increasing the gastight seal and gripping of the gasket with respect to the service line. Thus, a reproducible gastight, pull-out resistant joint is assured. This invention should not be considered as limited to the use of CERROBEND as other low melting point alloys may be employed.

A piston 60 is slidably disposed about the tube 36. Piston 60 includes an internal groove which is adapted to receive O-ring 62 in order to provide sealing between the piston and tube 36. Sealing is required when sleeve 56 melts as will be described further below. Piston 60 further includes a reduced portion 64 to which is clamped the rearward end or edge 51 of gasket 50 by means of the rear gasket retainer ring 66. The function and purpose of retainer ring 66 is to firmly clamp the rearward edge 51 of gasket 50 to piston 60. It should be appreciated that when in the condition shown in FIG. 3 (gasket 50 being clamped to piston 60) the piston 60 is, nevertheless, free to slide relative to tube 36. This is in counter distinction to the forward end 49 of the gasket 50 where the front ring 44 is soldered to tube 36 and is not free to move with respect thereto.

Interposed between piston 60 and transition body 30 is a compression spring 68. The rearward coil of spring 68 bears against the forward face of transition body 30 and is, thus, fixed relative to tube 36. The front coil of spring 68 bears against the subassembly defined by piston 60, gasket 50 and gasket retainer ring 66. This subassembly, as previously noted, is free to move or slide relative to tube 36.

When installed in the position shown in FIG. 3, spring 68 is in a state of compression and exerts a longitudinal force against piston 60 (and associated elements including gasket 50 and retainer ring 66); the opposite end of the compression spring being fixed by means of transition body 30.

In the preferred embodiment of applicant's invention, spring 68 is wound from high quality steel music wire. Piston 60 is fabricated from brass. O-ring 62 is defined by Buna N rubber.

It should be appreciated from a study of FIG. 3 that gasket 50 encloses and surrounds sleeve 56. The gasket is annular in transverse section and in longitudinal section has a forward end 49 and a rearward end 51. The gasket, thus, defines a fluid tight chamber 70 into which there is disposed a low melting point alloy in the form of a sleeve 56 and baffle 72. Chamber 70 is rendered fluid tight by reason of the fact that the forward end 49 of gasket 50 is firmly clamped to ring 44 which is itself soldered to tube 36. The rearward end 51 of gasket 50 is clamped to piston 60 which, as previously noted, is sealed with respect to tube 36 by means of O-ring 62. In the preferred embodiment of applicant's invention, baffle 72 is generally annular in shape and is fabricated from brass. It has a radial thickness about the same as sleeve 56 and is defined by outer beveled edges 73.

Figure 2:
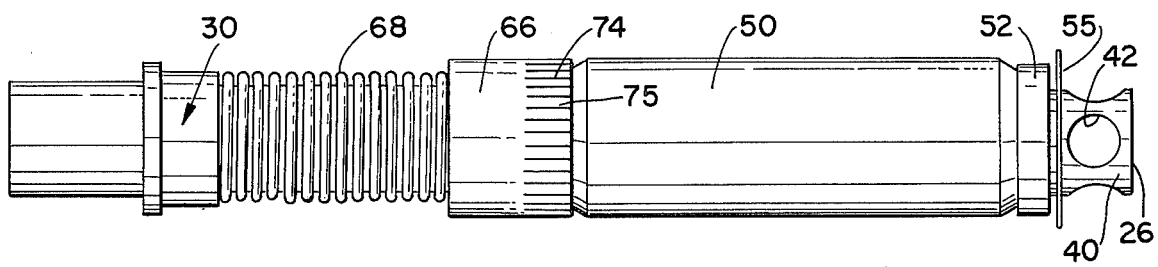
FIG. 2 is an elevational view of applicant's insertion apparatus.

Applicant's invention of FIG. 3 is shown prior to the application of heat. The elements of FIG. 3 are shown in elevation in FIG. 2 where it will be seen that rear gasket retainer ring 66 is provided with a plurality of slots 74 spaced about the retainer ring. Slots 74 define fingers 74 which function to retain the gasket 50 during its expansion precluding rearward movement as shown in FIG. 4.

A brief description will now be made of the manner of assembly of applicant's apparatus shown in FIG. 3.

In assembly, the front ring 44 is first installed by soldering the same to copper tube 36. Soldering is accomplished so that the front ring is in close proximity to groove 38. The exterior surface of ring 44 is coated with any suitable adhesive such as a cyanoacrylate adhesive. The forward end 49 of gasket 50 is pulled over ring 44 and, thereafter, gasket retainer ring 52 is installed. Excess gasket material is then trimmed flush with the forward surface of the front ring 44. Pin 92 is then installed.

Following installation of front ring 44, baffle 72 and sleeve 56 are disposed under gasket 50. O-ring 62 is then installed in piston 60 after being lubricated. The piston is then installed over the copper tube and under the rearward end 51 of gasket 50. Gasket 50 is then stretched to approximately double its relaxed length. The rearward end 51 of gasket 50 is then clamped to piston 60 by means of rear gasket retainer ring 66.

After applying flux to the external surface of copper tube 36 at the end thereof, the spring 68 is put in position. Thereafter, the transition body 30 is soldered to tube 36 with spring 68 held in a state of compression while heat is applied to the transition body 30 to make the solder joint with tube 36. Thereafter, the sealing and joining structure 24 is attached to plastic tubing 28 using attachment means well known to the art at cylindrical portion 32 of transition body 30.

Figure 5:
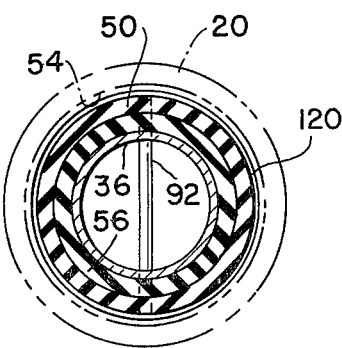
FIG. 5 is a cross-sectional view taken along the lines 5—5 of FIG. 3.
Figure 6:
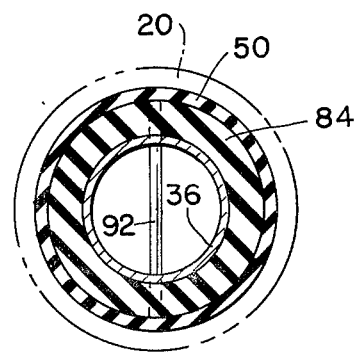
FIG. 6 is a cross-sectional view taken along the lines 6—6 of FIG. 4.

Prior to insertion of applicant's apparatus into an existing service line, washer 55 is installed in front groove 38 and the exposed exterior surface 76 of gasket 50 is coated with hot melt adhesive, epoxy adhesive or other suitable material 120 as shown in FIG. 5.

Once assembled in the manner just described, applicant's apparatus is then ready for insertion into an existing service line. It should be appreciated that the length of plastic tubing 28 will vary depending upon the length of the service line being repaired. With reference to FIG. 1, the plastic tubing 28 should have a length at least equal to the distance between the building foundation and the gas main 10.

The external diameter of gasket 50 is selected so that when inserted into an existing service line there will be defined a clearance 78 (FIG. 3) between the gasket and the internal wall 54 of the service line. This defined clearance 78 is maintained by the washer 55 during installation. Clearance 78 is provided not only to facilitate insertion of the apparatus into an existing service line but also to allow for any irregularities that may be present at the internal surface of the service line such as scale deposits. Advantageously it would be considered desirable to have a smooth, internal wall in the existing service line to which it is desired to join the apparatus of this invention. To that end, some installations may permit the application of a cleaning tool at the inside of the service line. Where cleaning is not possible, however, this invention provides for large area contact with the internal wall of the service line thus precluding leakage problems that may be induced by scale deposits.

The joint and seal of applicant's invention are activated by heat. As shown in FIG. 4, an electrical heating element 80 is advantageously employed with applicant's apparatus for the purpose of applying heat to sleeve 56. Heating element 80 is positioned within tube 36 in the manner shown in FIG. 4 prior to insertion of the apparatus into the existing service line. Heating element 80 may also be positioned to stop pin 92 after the fitting has been inserted into the service line. A relatively long conductor 82 provides for a source of electrical energy at the heating element.

Activation of applicant's apparatus takes place as follows.

After applicant's apparatus has been assembled in the manner described above and the exposed gasket surface has been coated with hot melt adhesive, the heating element 80 is inserted to stop pin 92 within tube 36 so that it is adjacent alloy sleeve 56. The heating element may advantageously be temporarily clipped to the stop pin 92 by clip 93 thus assuring its positioning during insertion. Thereafter the entire assembly is inserted into the existing service line through the free end of the service line at the building. Reference in this regard is made to location 18 of FIG. 1 where the point of insertion takes place. The entire assembly including the heating element is advanced into the service line a distance sufficient such that end 26 of tube 36 is brought into proximity to the ell. Once in place as shown in FIG. 3, the heating element 80 is activated causing heat to be applied to the alloy sleeve 56. At the melting point of the alloy sleeve, resistance to expansion of spring 68 and contraction of gasket 50 originally imparted by means of the rigid sleeve 56 is, thus, removed as a melt 84 (FIG. 4) is formed within gasket 50. This permits the spring to expand. As spring 68 expands, piston 60 is caused to move to the right of FIG. 4. Remembering that gasket 50 was originally stretched to approximately twice its relaxed length when initially installed in the structure shown in FIG. 3, it can be appreciated that creation of the melt 84 permits gasket 50 to contract. As a consequence, therefore, of both the expanding of spring 68 and the contraction of gasket 50 there is achieved a distortion, shaping or a radial expansion of the melt (as compared to the original alloy configuration) which, in turn, provides for a radial expansion of the gasket 50 into contact with the internal wall 54 of service line 20. As will be observed in FIG. 4, baffle 72 aids in the outward or radial expansion of the melt 84 and the gasket 50 by defining a pocket 86 into which the melt 84 may flow. It will be observed from FIG. 3 that in its unmelted condition, the sleeve 56 had a wall thickness approximately equal to that of baffle 72. The pocket 86 formed after melting of the sleeve provides for an increased radial thickness of the melt and, accordingly, an outward or radial expansion of the gasket 50.

Sufficient heat is applied to applicant's apparatus during installation thereof so that the alloy sleeve 56 is brought to a melted condition and the hot melt adhesive applied to the exposed or outer gasket surface 76 has had an opportunity to set at the internal wall 54 of conduit 20. In the interest of clarity, the hot melt adhesive at the gasket has not been shown in neither FIG. 3 nor FIG. 4. It should be appreciated, however, that the adhesive is provided at the location 88, FIG. 4, the area of contact of the gasket 50 and the internal wall of the service line. With sufficient heat having been applied during installation, the heating element 80 is turned off and the system is permitted to cool to ambient. Then the heating element 80 is retrieved from the plastic tubing by simply pulling on the conductor 82 with a force sufficient to disengage temporary clip 93 from stop pin 92. Once cooled, service may be restored as gas flows into holes 42 of tube 36 and through tubing 28. The flow of gas into the clearance space 90 of FIG. 4 is prohibited by the substantial area of sealing contact between gasket 50 and the internal wall 54 of service line 20. Nor can gas flow into the chamber 70 defined by gasket 50 in view of the fact that ring 44 is soldered to tube 36 and the forward end 49 of gasket 50 is sealingly clamped to ring 44. It is only the forward end 49 of the gasket 50 that is in communication with pressurized fluid. The rearward end 51 is not.

The spring 68 and gasket 50 thus define a shaping means to alter or change the shape of the low melting point alloy melt which, in turn, causes the gasket 50 to expand outwardly into contact with internal wall 54 of service line 20. The melt expands upon cooling thus making the joint even more secure. Such shaping means or radial expansion means is defined by one or more longitudinal forces which act on the melt.

As shown in FIGS. 3 and 4, applicant's apparatus advantageously provides for insertion of the end portion 40 of tube 36 a distance sufficient to contact the internal wall 94 of street ell 17. In such position, it can be seen in FIG. 4 that upon activation of the heating element 80, a seal structure is achieved which contacts not only the internal wall 54 of service line 20 but also contact is made at the internal wall 100 of the street ell. Gasket 50 thus provides for sealing at the threaded interconnection 102 between the service line 20 and the street ell 17. As a consequence, any leakage in the service line 20 or leakage at the threads 102 interconnecting the service line 20 with the street ell 17 will be isolated by the placement of applicant's apparatus in the manner shown in FIG. 4.

Applicant's apparatus is adapted to be installed in the repair of a service line without interrupting the flow of natural gas in the main. To that end, there are provided, as shown in FIGS. 3 and 4, a plurality of seals at the external surface of plastic tubing 28 as well as a plurality of seals 108, 110, 112 which are inside the transition body 30 and the tube 36 and which are carried by conductor 82. Exterior seals 104, 106 provide for sealing in the space 78 between applicant's apparatus and the internal wall 54 of the service line 20 and function to prevent the flow of gas from the main into clearance 78 in a manner so as to escape into the building. Similarly, internal seals 108, 110, 112 are carried by conductor 82 and provide for sealing within the fluid conduit defined by the plastic tubing 28, transition body 30 and tube 36 to prevent the flow of natural gas from the main into the building. Upon completion of the heating operation, withdrawal of the heating element 80 carries with it the internal seals 108, 110, 112 permitting the uninterrupted flow of gas from the main to the building through tube 36 and plastic tubing 28. Exterior seals 104, 106 are retained in place after completion of the joint since there is no necessity for their removal. It should be appreciated, however, that exterior seals 104, 106 serve no useful purpose after the placement of gasket 50 has been completed as shown in FIG. 4.

Applicant's apparatus lends itself not only to the repair of existing service lines but also the relining of pipe for any purpose.

Applicant's method of repair of existing service lines will now be described.

A method of repair of a fluid conduit through the insertion of a tubular member therein comprising the steps of: providing a tubular member having a free end; disposing a low melting point alloy sleeve about said tubular member; disposing an elastomeric gasket around said sleeve; providing a compression spring having one end thereof in operative engagement with said sleeve and the other end thereof fixed relative to said tubular member; inserting the free end of said tubular member including the alloy sleeve; gasket and compression spring into said fluid conduit a distance sufficient to permit said free end to pass the location of the leak in said conduit; applying heat to said sleeve causing it to melt whereby said compression spring exerts a longitudinal force on the melt causing said melt to expand radially outwardly thereby forcing the gasket into sealing contact with the internal wall of said fluid conduit, permitting the melt to cool whereby it expands, increasing the outward radial force on the gasket.

Applicant's method for the lining of existing pipe will now be described.

A method of lining a fluid conduit through the insertion of a tubular member therein comprising the steps of: providing a tubular member having a free end, disposing a low melting point alloy sleeve about said tubular member; disposing an elastomeric gasket around said sleeve; providing a compression spring having one end thereof in operative engagement with said sleeve and the other end thereof fixed relative to said tubular member; inserting the free end of said tubular member including the alloy sleeve; gasket and compression spring into said fluid conduit a distance sufficient to permit said free end to pass the location of the leak in said conduit; applying heat to said sleeve causing it to melt whereby said compression spring exerts a longitudinal force on the melt causing said melt to expand radially outwardly thereby forcing the gasket into sealing contact with the internal wall of said fluid conduit, permitting the melt to cool whereby it expands, increasing the outward residual force on the gasket.

MODIFICATIONS OF THE INVENTION

Several modifications of the invention are contemplated and should be considered within the spirit thereof.

The particular low melting point alloy selected by applicant for sleeve 56 should not be considered as limiting as other alloys may be used in lieu thereof.

In applicant's preferred apparatus, there is provided a radial expansion of the low melting point alloy as it turns from the solid state (sleeve 56) to the liquid state (melt 84) with a subsequent outward expansion of the gasket 50. Applicant achieves this result through the imposition of a longitudinal or axial force which generally acts from left to right in FIG. 4. The longitudinal force is induced not only by the expansion of spring 68 but also the contraction of the stretched gasket 50. In some cases it may be possible to eliminate spring 68 entirely relying on the contraction of the stretched gasket 50 to produce radial expansion thereof.

While the preferred embodiment of the invention as shown in FIGS. 3 and 4 includes a single spring 68 which is located outside of the gasket 50 it should be appreciated that alternate locations of the spring are possible including locations inside of the gasket. The spring could, for example, be associated with the sleeve 56 inside of gasket 50 so as to provide for radial expansion of the melt and, consequently, radial expansion of the gasket 50. Still alternate embodiments may be employed where a pair of springs are used one located on either side of the gasket such as a duplicate arrangement to that shown in FIG. 3. This embodiment may be desirable when, for example, it is necessary to impart a greater longitudinal force to the gasket than would be possible with a single spring.

While in the preferred embodiment of the invention, the baffle 72 has been employed having a sleeve-like configuration it should be appreciated that modifications of the invention are possible which eliminate the baffle altogether or, alternately, provide for baffles of varying shapes. Still further modifications are possible in which the baffle structure is caused to be formed as a part of the low melting point alloy material.

What is claimed is:

1. A joint for interconnecting two tubular conduits one of which is at least partially disposed within the other, said joint comprising in combination:
   a first tubular conduit having an internal wall;
   a second tubular conduit having an external wall, at least a portion of said second conduit being disposed within said first conduit; and
   sealing and joining means positioned between said first conduit internal wall and said second conduit external wall for permanently sealing and joining said two conduits to each other, said sealing and joining means comprising:
   an elastomeric gasket surrounding said second conduit in a fluid tight manner, said gasket being in sealing contact with the internal wall of said first tubular conduit; and,
   a low melting point alloy sleeve which is positioned between said gasket and said outer surface of said second conduit, said sleeve having been permanently deformed to urge said gasket into sealing contact with said internal wall of said first tubular conduit.

2. The invention of claim 1 in which an adhesive is disposed between said gasket and the internal wall of said first tubular conduit.

3. A joint for interconnecting two tubular conduits one of which is at least partially disposed within the other, said joint comprising in combination:
   a first tubular conduit having an internal wall;
   a second tubular conduit having an external wall, at least a portion of said second conduit being disposed within said first tubular conduit; and
   sealing and joining means positioned between said first conduit internal wall and said second conduit external wall for permanently sealing and joining said two conduits to each other, said means comprising:
   a low melting point alloy sleeve surrounding said second tubular conduit;
   an elastomeric gasket enclosing said sleeve and surrounding said second conduit in a fluid tight manner;
   radial expansion means to provide for the radial expansion of said sleeve and hence said gasket;

whereby said gasket is caused to be brought into sealing engagement with said internal wall of said first tubular conduit.

4. The invention of claim 3 in which said radial expansion means is defined by a longitudinal force exerting member which exerts a longitudinal force against said sleeve after it is heated to its melting point causing the radial dimension of said sleeve to increase while its axial dimension decreases thereby causing the radial dimension of the gasket to increase producing movement of said gasket into sealing contact with the internal wall of said first tubular conduit.

5. The invention of claim 4 in which said longitudinal force is imparted by means of at least one compression spring having one end thereof fixed with respect to said second tubular conduit and the other end thereof in operative contact with said sleeve.

6. The invention of claim 5 in which a piston member is interposed between said spring and said sleeve.

7. The invention of claim 6 in which said gasket, at one end thereof, is secured to said piston member and, at the other end thereof, is secured to said second tubular member.

8. The invention of claim 7 in which a baffle is disposed within said gasket.

9. The invention of claim 7 in which said gasket is initially positioned in a state of longitudinal tension whereby upon the application of heat to said sleeve said gasket contracts.

10. The invention of claim 3 wherein the melting point of said low melting point alloy sleeve is approximately 150° F.

11. The invention of claim 3 wherein said low melting point alloy sleeve expands upon cooling thus increasing the fluid tightness of the joint.

12. A joint for interconnecting two tubular conduits one of which is at least partially disposed within the other, said joint comprising in combination:
a first tubular conduit having an internal wall;
a second tubular conduit having at least a portion thereof disposed within said first tubular conduit;
sealing and joining means between said first and second tubular conduits comprising;
an elastomeric gasket disposed about said second tubular conduit, said gasket being generally annular in transverse section and, in longitudinal section, having a forward end and a rearward end, there being defined a chamber between said second tubular conduit and said gasket;
a low melting point alloy disposed in said chamber;
sealing means at the respective forward end and rearward end of said gasket and the external surface of said second tubular conduit;
shaping means to change the shape of said low melting point alloy in said chamber after the application of heat thereto and the change of state thereof from a solid to a liquid phase, whereby,
the radial dimension of said gasket is increased causing said gasket to be brought into sealing engagement with the internal surface of said first tubular conduit.

13. The invention of claim 12 in which said forward end of said gasket is operatively secured to said second tubular conduit.

14. The invention of claim 12 in which said rearward end of said gasket is secured to a piston element which is itself in sealing but slidable relationship with the external surface of said second tubular conduit.

15. The invention of claim 12 in which said shaping means is defined by a longitudinal force imparted to said piston thereby causing a movement of said piston.

16. The invention of claim 15 in which said longitudinal force is provided by a coil spring operatively engaging said piston.

17. The invention of claim 16 in which said coil spring has one end thereof fixed with respect to said second tubular conduit.

18. The invention of claim 12 in which said gasket, prior to the application of heat to said low melting point alloy, is in a state of tension.

19. The invention of claim 18 in which said shaping means is defined by contraction of said gasket under tension after heat is applied to said low melting point alloy.

20. The invention of claim 12 in which said low melting point alloy, in its solid state, is defined as a sleeve.

21. The invention of claim 20 in which a baffle is disposed within said chamber.

22. The invention of claim 21 in which said baffle has a radial thickness approximately that of said sleeve.

* * * * *